UNITED STATES PATENT OFFICE.

SAMUEL BARR, OF PROVIDENCE, RHODE ISLAND.

MANUFACTURE OF GAS-TUBING.

SPECIFICATION forming part of Letters Patent No. 244,170, dated July 12, 1881.

Application filed April 8, 1881. (No specimens.)

*To all whom it may concern:*

Be it known that I, SAMUEL BARR, of Providence, in the county of Providence and State of Rhode Island, have invented certain new and useful Improvements in the Manufacture of Gas-Tubing, of which the following is a full, clear, and exact description.

My invention has special relation to the manufacture of gas-tubing of the flexible sort now commonly employed; but it is also applicable to other manufactures as well, as will be apparent from the following description.

The object of my present invention is the suitable treating of compounds composed largely of glue and glycerine, for the purpose of rendering them less liable to absorb water from the atmosphere or to be injuriously affected by the heat to which they are ordinarily exposed; and to this end the invention involves the application to the dried compound of a peculiar varnish, as will be hereinafter first fully described, and then pointed out in the claims.

In my patent No. 230,480, dated January 11, 1881, I have described a compound for the manufacture of tubing, &c., and my present invention is an improvement thereon, or an addition thereto. I do not, therefore, desire to be understood as making any claim to matters covered by said patent.

It is a well-known fact that tubing made from glue and glycerine alone flattens and gets out of shape under the influence of the heat from gas-stoves, chandeliers, and other burners about which it is used.

Tubing treated by my improved method will withstand all the heat to which it is liable to be exposed, and if placed within the flame it will not melt and run down, as in other peculiar tubings, neither will it deteriorate by exposure to the moisture of the air, nor yet dissolve when immersed in water.

To make a tubing suitable for general use I cover a spiral spring with braid and oil it, after the manner of any of the usual manufactures. I then apply, by preference, the compound composed of glue, glycerine, soap, borax, copperas, and water, as set forth in my before-named patent. This is applied by "dipping," as many coats being formed as desired.

Then, when the moisture is expelled, (generally after about forty-eight hours,) I apply my bichromated oil-varnish, preferably by a sponge or other suitable material.

To make the varnish I take of bichromate of potash one ounce and dissolve the same in about twelve ounces of water. When thoroughly dissolved I mix with this about twelve ounces of linseed-oil, and when ready for use it makes a thick yellow cream or emulsion. For the same purpose of curing or rendering a glue and glycerine compound heat-proof I can use chromic acid, ammonia, and linseed-oil; also bichromate of ammonia and oil, or chromate of soda and oil, or chromate of magnesia and oil; or I can use tannic acid and oil, or any of the equivalents of bichromate of pottassium with oil; but I prefer to use bichromate of potassium with oil, for the reason that it is more simple and easier to be applied, and incorporates itself with the surface of the foundation compound to better advantage. I also use oil, instead of water, for the reason that it spreads more evenly on the compound, and the surface of the compound does not admit of its running together in spots, leaving other spots bare or unprotected, thus making the compound uneven in texture, causing it to be harder in some places than in others.

It should be observed that the bichromated oil-varnish is not mixed with the compound of glue and glycerine, but is applied in a thick coating or exterior cover. It unites with the surface of the already dried compound, and affords an indestructible and insoluble article for general use, as before explained.

The treated fabric or compound preserves a degree of flexibility sufficient for all ordinary purposes, and it is, moreover, not liable to crack or break from frequent handling or using.

Having now fully described my invention, what I claim as new, and desire to secure by Letters Patent, is—

1. The herein-described bichromated oil-varnish, adapted to be applied to the surface of compounds of glue and glycerine for rendering the same indestructible by heat, substantially as before set forth.

2. In combination with a glue-and-glycerine compound, an exterior varnish of bichromated oil for rendering said compound indestructible by heat and insoluble in water, substantially as before set forth.

3. In the manufacture of gas-tubing, the foundation composed of glue and glycerine with soap, borax, copperas, and water, as hereinbefore explained, the same being covered or coated with bichromated oil-varnish, as and for the purposes set forth.

In testimony that I claim the foregoing I have hereunto set my hand in the presence of two witnesses.

SAMUEL BARR.

Witnesses:
J. R. McADAM,
SAML. T. DOUGLAS.